May 8, 1962 S. SIMS 3,033,581
PIPE JOINT SEAL
Filed Aug. 28, 1958
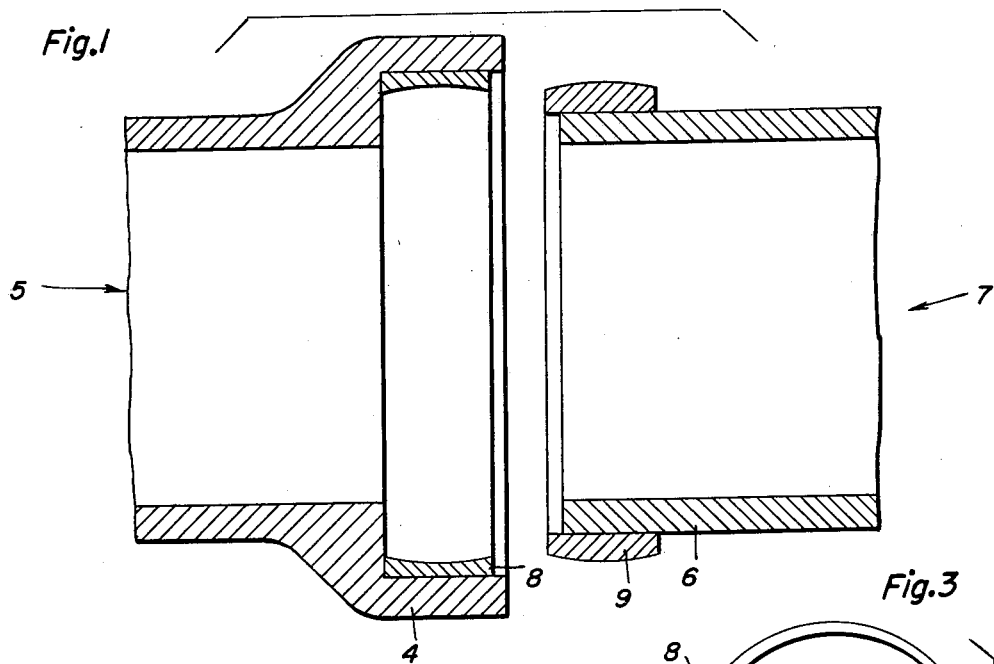
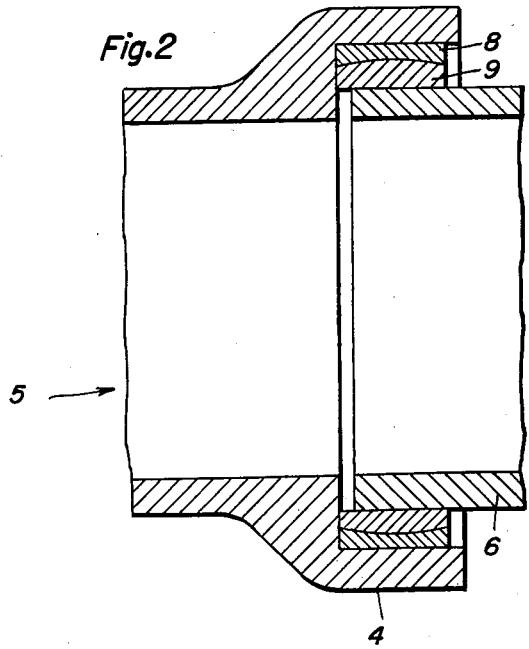
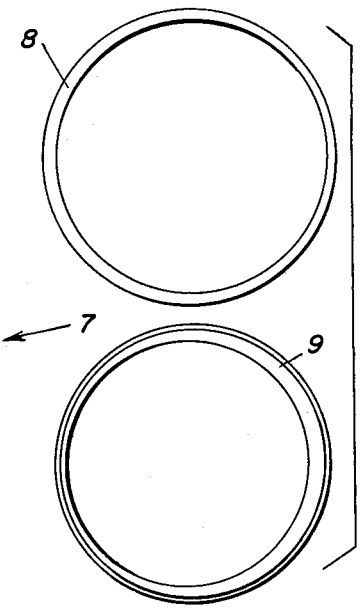
Sanford Sims
INVENTOR.
BY *Clarence A. O'Brien*
and *Harvey B. Jacobson*
Attorneys 3,033,581
PIPE JOINT SEAL
Sanford Sims, Pleasant Hill, Calif.
(281-A Perkins St., Oakland, Calif.)
Filed Aug. 28, 1958, Ser. No. 757,719
1 Claim. (Cl. 277—169)

This invention relates to new and useful improvements in bell and spigot pipe joint seals of the type comprising compressible, complemental elements in the form of a lining and a band or collar engageable therein, and has for its primary object to provide, in a manner as hereinafter set forth, novel means for tightly sealing said elements to each other and to the pipe sections for positively preventing leakage in either direction or the entrance of roots, etc.

Another very important object of the present invention is to provide a pipe joint seal of the aforementioned character wherein the elements may be applied to the sections at the time of manufacture or installed on the job.

Still another important object of the invention is to provide a seal of the character described which insures flexibility of the joint and obviates the necessity of plastering or caulking thus saving considerably in like, labor and cost.

Other objects of the invention are to provide a pipe joint seal of the character set forth which will be comparatively simple in construction, strong, durable, compact and which may be manufactured at low cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a view in longitudinal section through the bell and spigot end portions of a pair of pipe sections provided with a seal embodying the present invention, showing said sections separated;

FIGURE 2 is a longitudinal sectional view substantially similar to FIGURE 1 but showing the pipe sections joined; and FIGURE 3 is an end elevational view of the sealing elements constituting the present invention, showing said elements separated.

Referring now to the drawings in detail, it will be seen that reference character 4 designates the usual bell on one end of a conventional pipe section 5. The bell 4 is for the reception of the spigot end portion 6 of a similar pipe section 7.

The embodiment of the present invention which has been illustrated comprises an annular compressible lining 8 of substantially plano-concave cross-section and including a radially offset inner periphery. The lining 8 is for insertion in the bell 4 and, if desired, may be adhesively or otherwise suitably secured in position. The compressible lining 8 may also be of any desired dimensions.

The lining 8 is for the reception of a complemental, compressible, band or collar 9 of the same material which encircles the spigot end 6 of the pipe section 7. The band or collar 9, which may also be adhesively or otherwise suitably secured on the spigot end 6 of the section 7, is substantially plano-convex in cross-section and includes a radially offset outer periphery.

It is thought that the invention will be readily understood from a consideration of the foregoing. Briefly, the spigot end 6 of the pipe section 7 is telescoped in the usual manner into the bell 4 of the previously laid pipe section 5, thus engaging the compressible band or collar 9 in the compressible lining 8. The spigot section 7 is then turned relative to the bell section 5 for rotatably adjusting and tightening the band or collar in the complemental lining 8 in an obvious manner. Thus, the elements 8 and 9 are compressed for providing a tight, flexible leak-proof joint.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

A seal for bell and spigot type pipe joints comprising: a compressible annular lining of substantially plano-concave cross-section adapted to be mounted circumferentially in the bell and including a continuous radially off-center inner periphery, and a compressible, complemental band of substantially plano-convex cross-section adapted to be mounted circumferentially on the spigot and rotatably adjustable in said lining and including a continuous radially off-center outer periphery frictionally engaging the inner periphery of said lining.

References Cited in the file of this patent

UNITED STATES PATENTS

| | | |
|---|---|---|
| 157,356 | Stanford | Dec. 1, 1874 |
| 377,988 | Bowers | Feb. 14, 1888 |
| 1,152,002 | Bryant | Aug. 31, 1915 |
| 1,309,609 | Bryant | July 15, 1919 |
| 2,770,476 | Cleverly | Nov. 13, 1956 |